(12) United States Patent
Vistrom et al.

(10) Patent No.: US 9,776,374 B2
(45) Date of Patent: Oct. 3, 2017

(54) SMOOTHLY BENDABLE BOARD (75) Inventors: Magnus Vistrom, Sundsvall (SE); Rickard Hagglund, Kvissleby (SE)

(73) Assignee: SCA FOREST PRODUCTS AB, Sundsvall (SE)

( * ) Notice: Subject to any disclaimer, the term of this patent is extended or adjusted under 35 U.S.C. 154(b) by 387 days.

(21) Appl. No.: 14/233,453

(22) PCT Filed: Jul. 20, 2011

(86) PCT No.: PCT/SE2011/050956
§ 371 (c)(1),
(2), (4) Date: Jan. 17, 2014

(87) PCT Pub. No.: WO2013/012362
PCT Pub. Date: Jan. 24, 2013

(65) Prior Publication Data
US 2014/0162030 A1    Jun. 12, 2014

(51) Int. Cl.
*B32B 3/28* (2006.01)
*B32B 37/14* (2006.01)
*B31F 1/28* (2006.01)
*D21H 27/10* (2006.01)
*D21H 27/30* (2006.01)
(Continued)

(52) U.S. Cl.
CPC .............. *B32B 3/28* (2013.01); *B31F 1/28* (2013.01); *B32B 27/06* (2013.01); *B32B 27/10* (2013.01); *B32B 37/144* (2013.01); *D21H 27/10* (2013.01); *D21H 27/30* (2013.01);
(Continued)

(58) Field of Classification Search
CPC . B31F 1/28; B32B 27/06; B32B 27/10; B32B 3/28; B32B 37/144; D21H 27/10; D21H 27/30; D21H 2307/546; D21H 2307/752; Y10T 156/1025; Y10T 428/24694
See application file for complete search history.

(56) References Cited

U.S. PATENT DOCUMENTS

| 4,007,309 | A |   | 2/1977 | Sewell |
| 4,286,006 | A | * | 8/1981 | Boelter ................. B32B 3/28 428/182 |

(Continued)

FOREIGN PATENT DOCUMENTS

| AU | EP 0279609 A2 * | 8/1988 | ............ B31F 1/2813 |
| CN | 1646390 A | 7/2005 | |

(Continued)

OTHER PUBLICATIONS

JP 2004114656 A_Machine Translation.*

(Continued)

*Primary Examiner* — Maria Veronica Ewald
*Assistant Examiner* — Travis Figg
(74) *Attorney, Agent, or Firm* — Drinker Biddle & Reath LLP (57) ABSTRACT

A smoothly bendable board including a middle layer, a first outer layer attached to the middle layer and a second outer layer attached to the middle layer is disclosed. The second outer layer has a lower bending stiffness according to ISO 5628 than the first outer layer such that the smoothly bendable board is outwardly bendable only in a direction towards which the second layer faces. A method for producing a smoothly bendable board is also disclosed.

10 Claims, 3 Drawing Sheets

(51) Int. Cl.
*B32B 27/06* (2006.01)
*B32B 27/10* (2006.01)

(52) U.S. Cl.
CPC ... *B32B 2307/546* (2013.01); *B32B 2307/752* (2013.01); *Y10T 156/1025* (2015.01); *Y10T 428/24694* (2015.01)

(56) References Cited

U.S. PATENT DOCUMENTS

| | | | |
|---|---|---|---|
| 4,343,533 A | 8/1982 | Currin et al. | |
| 4,489,120 A | 12/1984 | Hollinger, Jr. | |
| 2002/0106468 A1 | 8/2002 | Obeshaw | |
| 2004/0170810 A1* | 9/2004 | Rasmussen | B32B 3/28 428/174 |
| 2005/0214512 A1* | 9/2005 | Fascio | B31D 5/0073 428/182 |
| 2006/0165960 A1 | 7/2006 | Rydberg | |

FOREIGN PATENT DOCUMENTS

| | | |
|---|---|---|
| JP | H0550540 | 3/1993 |
| JP | 2004114656 A * | 4/2004 |
| SU | 1630609 A3 | 2/1991 |
| WO | WO 96/32250 A1 | 10/1996 |
| WO | WO 02/102592 A1 | 12/2002 |
| WO | WO-2011/075046 A1 | 6/2011 |

OTHER PUBLICATIONS

Paperonweb (http://www.paperonweb.com/grade.html).*
Chinese Office Action dated Nov. 2, 2014 issued in corresponding Chinese patent application No. 201180072359.4 (14 pages).
Extended European Search Report dated Mar. 13, 2015 issued in corresponding European patent application No. 11869692.1 (5 pages).
English-language translation of a Russian Decision on Grant issued in corresponding Russian patent application No. 2014106275 (7 pages).

* cited by examiner

SMOOTHLY BENDABLE BOARD

CROSS-REFERENCE TO PRIOR APPLICATION

This application is a §371 National Stage Application of PCT International Application No. PCT/SE2011/050956 filed on Jul. 20, 2011, which is incorporated herein in its entirey.

TECHNICAL FIELD

The present disclosure relates to a smoothly bendable board including a middle layer, a first outer layer attached to the middle layer and a second outer layer attached to the middle layer. The disclosure also relates to a method for producing a smoothly bendable board.

BACKGROUND

There is today a desire for having the possibility to create curved forms to attract customers, for example in the context of developing point of sales displays or packaging or other features for marketing purposes. Examples may be cylindrical or oval packages and point of sales displays used to construct large scale models of soft drink cans or spice jars etc., which could be used in e.g. supermarkets for marketing purposes.

Presently displays or packaging may be fabricated by carton board or various types of corrugated board, either single faced corrugated board or double faced corrugated board. The problem with these materials is that they do not allow for displays or packagings that are curved without encountering issues.

High grammage carton board and double faced corrugated board may deform if bent to too small of a radius. Carton board and single faced corrugated board are deficient in stability and the possibility to fasten heavier items onto them without deforming or collapsing is limited thereby making construction of, for instance, display stands difficult. Because of the lack of stability, single faced corrugated board is not suitable for converting operations.

There is thus a need for an improved smoothly bendable board.

SUMMARY

It is desired to provide a smoothly bendable board where the previously mentioned problems are avoided. This can be achieved by a smoothly bendable board including a middle layer, a first outer layer attached to the middle layer and a second outer layer attached to the middle layer, wherein the second outer layer has a lower bending stiffness according to ISO 5628 than the first outer layer such that the smoothly bendable board is outwardly bendable only in a direction towards which the second layer faces.

When referring to bending stiffness, measurements of the bending stiffness are made according to ISO 5628.

Smoothly bendable in this application is defined as a material's ability to bend according to a smooth and continuous radius, in this case the ability of the first outer layer to bend according to a smooth and continuous radius. After bending of the first outer layer, the first outer layer should not display any irregularities such as for instance kinks.

Commercial corrugated board can be bent into curved forms having a radius of about 400-440 mm when bent perpendicular to the corrugated pipes. Using this material, besides not reaching a smaller radius than about 400 mm, there are several other problems associated with bending commercial corrugated board perpendicular to the corrugated pipes. Since, quite a lot of force is required to bend the material; it is easy for kinks to occur when approaching a radius of 400 mm. To create a circular form having this radius a sheet of corrugated board with a length of 2760 mm excluding any needed overlap is required. This sheet size is not available commercially.

Because of the stiffness of the corrugated board, it is also difficult to join the ends of the material in a way that will result in an acceptable circular form. Another problem with respect to bending the material perpendicular to the corrugated pipes is that the material will get a lower bending stiffness in the vertical upright direction. Hence, the maximum load e.g. a display stand can take will be quite limited. If the corrugated board instead would be bent along the corrugated pipes the radius needs to be about 3-4 times bigger to avoid kinks.

The following description primarily focuses on a smoothly bendable board where the middle layer is corrugated, i.e. comprises flutes. However, the description for the outer layers is valid for the cases where the middle layer includes a different material than flutes such as, for instance, a thermoformed core.

One condition to get a smooth and continuous radius is that the second outer layer should buckle between each peak of the corrugated middle layer when the material is subjected to bending in the bendable direction. When each section of the second outer layer exhibit buckling, the bending can be distributed across each section of the material. The above can theoretically be described by Euler's 4th case of buckling, $$Pk = \frac{4\pi^2 EI}{\lambda^2}, \tag{Equation 1}$$

where
Pk=the buckling force, i.e. the force that corresponds to when the material starts to buckle,
EI=the material's bending stiffness and
$\lambda$=the length between two peaks of the corrugated middle layer, i.e. the length between attachment points of the flutes to the second outer layer.

When the smoothly bendable board is exposed to bending, the material in the second outer layer will start to buckle between the tops of the corrugated middle layer if the bending stiffness of the second outer layer is low enough.

If the bending stiffness of the second outer layer is too high, the second outer layer will instead break, i.e. get a kink, when the applied force Pk has reached the material's compression strength according to the short-span compressive test according to ISO 9895, hereinafter referred to as SCT. In the case of too high of a bending stiffness of the second outer layer, the second outer layer will not be subject to buckling and therefore the material will not necessarily bend according to a smooth and continuous radius.

If the bending stiffness of the first outer layer is high enough even though the second outer layer is not subject to buckling, it may still be possible to bend the material into a more or less accurate curve form. However, the result will not be as good as if the second outer layer has been subject to buckling.

In order to get the sections of the second outer layer to exhibit buckling, the compression strength (SCT) of the second outer layer should be higher than the buckling Pk (measured in N/m), i.e. Pk<SCT. Using this inequality and rearranging equation 1 we get $$EI_{second\ outer\ layer} < \frac{SCT \cdot \lambda^2}{4\pi^2},$$ (Equation 2), where
$EI_{second\ outer\ layer}$=the bending stiffness of the second outer layer.

In order to have a material that will bend according to a smooth continuous radius a second condition is required. The bending stiffness of the second outer layer needs to be lower than the bending stiffness of the first outer layer. When the smoothly bendable board is subject to bending, the second outer layer should deform inwards or fold between the peaks of the corrugated middle layer. The location of where a bending moment is applied will determine where the second outer layer first will start to bend or fold. If the bending stiffness of the second outer layer is too high in relation to the first outer layer, the material will not bend into a smooth continuous radius. A high bending stiffness of the second outer layer requires a high bending moment in order to bend/fold the second outer layer and hence the smoothly bendable board. When the second outer layer starts to bend/fold between two peaks of the flutes of the middle layer, i.e. having a high applied moment, the first outer layer will easily kink if its bending stiffness is not high enough, due to the sudden drop of bending stiffness of the second outer layer as the second outer layer folds. Once the first outer layer gets a kink, the material will not bend into a smooth continuous radius. If the second outer layer has been bent/folded between two of the peaks of the corrugated middle layer, the difference with respect to the required moment between bending/folding the next section of the second outer layer and re-bending/folding the already bent section of the second outer layer, should be as small as possible. Hence, the drop in bending stiffness of the second outer layer between two peaks after bending/folding should be as low as possible. In other words, the bending stiffness should be as low as possible. However, if the first outer layer has a higher bending stiffness, it would be possible to allow a higher bending stiffness of the second outer layer.

If all the sections of the second outer layer exhibit buckling and the bending stiffness of the first outer layer is high enough compared to the second outer layer, (as mentioned above) the smoothly bendable board will bend into a smooth and continuous radius. However, the different sections of the second outer layer will eventually get kinks as the bending radius decreases. These kinks will not affect the function of the material. However, if the second outer layer in some way will be exposed to consumers, it could be advantageous (from a design perspective) if there are no kinks. To avoid these kinks, the following condition is required:

$$\sigma^*_{MAX} < SCT,$$ (Equation 3), where $$\sigma^*_{MAX} = \frac{t}{2} \frac{E^*}{\left(\left(\frac{\lambda}{16}\left(\frac{1}{\beta}\left(\frac{R_0}{R_0+T}\right)^2 + \beta\right)\right)\right)},$$ (Equation 4), where
$E^* = E \cdot t,$ $$\beta = \sqrt{\left(1 - \frac{R_0}{R_0+T}\right)},$$

E=Young's modulus,
t=thickness of second outer layer,
$R_0$=bending radius as measured to the second outer layer, T=thickness of the total board, i.e. the distance between the outer surface of the first outer layer and the outer surface of the second outer layer.

Having a board that is bendable in essentially one direction only provides the possibility to produce attractive stands and advertising material for instance for supermarkets and similar. A smoothly bendable board may be formed into new types of cylindrical or oval packages and displays. By using a smoothly bendable board it would for example be possible to construct large scale models of soft drink cans or spice jars and similar, which could be used as displays for marketing purposes. Another advantage is to utilize the bending property of the smoothly bendable board to offer easy to open packages that for example will open when a force is applied on each side of it.

Compared to single faced corrugated board a smoothly bendable board as described herein is compatible with conventional converting machinery such as printing and die-cutting.

Further, as both sides of the smoothly bendable board have smooth surfaces, whereas the single faced corrugated board has fluting facing one side. Thus, the smoothly bendable board is less likely to get stuck in converting equipment.

Other possible applications could be to use the built-in spring feature, as the material is returning to its original position after bending, to construct smart opening devices such as self opening packages or novelty saloon doors etc.

A smoothly bendable board can be made thicker without adding weight compared to a similar construction made of carton board thereby making it easier to fasten different objects such as shelves or similar to the smoothly bendable board. The smoothly bendable board may also be made sturdier and more stable than a similar carton board construction.

Additionally, it is possible to obtain single curved shaped constructions and designs using the smoothly bendable board compared to ordinary corrugated board or carton board without having the material deform. This may be interesting in a packaging context as the possibility to make a curved form with a small radius might be attractive to consumers.

By having a higher bending stiffness in the first outer layer than in the second outer layer it is made difficult for the smoothly bendable board to bend in the direction towards which the first outer layer faces.

The smoothly bendable board may have a middle layer which is a corrugated layer including flutes. The smoothly bendable board may be outwardly bendable only in a direction towards which the second layer faces, where the direction is essentially perpendicular to the flutes of the middle layer.

The smoothly bendable board may have a bending stiffness of the second outer layer chosen such that each section of the second outer layer exhibits buckling according to the equation:

$$EI_{second\ outer\ layer} < \frac{SCT \cdot \lambda^2}{4\pi^2}.$$

The first and/or second outer layer may be made up of a material having a surface suitable for printing.

As mentioned earlier, one application of the smoothly bendable board is to use it as advertising displays or packages. Having surfaces adapted for this simplifies production and handling.

The first outer layer may be made up of one of a liner, paper or plastic or a laminate of any two or more of a liner, paper or plastic or a composite material.

These materials display the desired characteristics of bending stiffness for the first outer layer and are easily adaptable to suit the different requirements needed in order to vary the smoothly bendable board to different uses. For instance, any kind of printable surface attachable either to the flutes directly or laminated on top of another surface attached to the flutes or another form of middle layer is conceivable.

The second outer layer may be made up of one of a liner, paper or plastic or a laminate of any two or more of a liner, paper or plastic or a composite material.

The first outer layer and/or the second outer layer may be made up of one of a fine paper, supercalendered paper, machine-glazed paper, greaseproof paper, newsprint or machine-finished paper, liner, metal foil, metalized film or a composite material or a laminate of any two or more of a fine paper, supercalendered paper, machine-glazed paper, greaseproof paper, newsprint or machine-finished paper, liner, metal foil, metalized film or a composite material such as cellulose fibre reinforced polymers (e.g. including nanocellulose).

These materials display the desired characteristics of bending stiffness for the second outer layer and are easily adaptable to suit the different requirements needed in order to vary the smoothly bendable board to different uses.

The corrugated middle layer may include any of the flute sizes A, B, C, E, F, G or K or include some other suitable core material such as a thermoformed structured core, containing cavities. It could, for example, be a core material with cup-shaped imprints (punctual support). The thermoformed core may form a continuous middle layer or it may form a middle layer where the thermoformed core material is present intermittently between the first and second layers. The thermoformed core may for instance be made of plastics or a cellulose-based material. In the case of using a thermoformed core, the thermoformed core have to be flexible in order to be able to follow the bending of the first and second outer layers.

Embodiments of the invention also relate to a method for producing a smoothly bendable board including a middle layer, a first outer layer and a second outer layer, where the method includes:
attaching the first outer layer to the middle layer, producing a single-face board;
attaching the second outer layer to the middle layer, wherein the second outer layer has a lower bending stiffness according to ISO 5628 than the first outer layer such that the smoothly bendable board is outwardly bendable only in a direction towards which the second layer faces.

The method may also include:
arranging the single-face board such that it is flat prior to attaching the second outer layer to the middle layer.

This ensures that the smoothly bendable board does not bend in an undesired direction.

The method may also include:
using an initially curved single faced board curved in the direction towards which the first layer faces, and arranging the initially curved single faced board to be flat before attaching the second outer layer.

By using an initially curved single faced corrugated board in the direction of the corrugated middle layer, and arranging it to be flat before attaching the second outer layer; it is more difficult for the smoothly bendable board to spontaneously bend in the direction towards which the second layer faces.

By using this production method, it is possible to add bending resistance (in the direction towards the second outer layer) to the material.

The method may also include:
attaching the first outer layer to the middle layer, producing a single-face board;
arranging the single-face corrugated board such that it is curved in a direction towards which the second layer faces;
attaching the second outer layer to the curved corrugated middle layer.

The result will be an initially curved material that is restricted from returning to a flat phase, but still further bendable towards the direction which the second layer faces and perpendicular to the flutes of the corrugated middle layer.

The method may be used when the middle layer of the smoothly bendable board is a corrugated layer including flutes or other suitable core material such as a thermoformed core. For the described method according to above, the second outer layer may be attached onto the middle layer before the first outer layer is attached onto the middle layer. The first outer layer and the second outer layer may also be attached simultaneously onto the middle layer.

DETAILED DESCRIPTION OF DRAWINGS

In the drawings, like features have the same reference numbers.

Figure 1A:
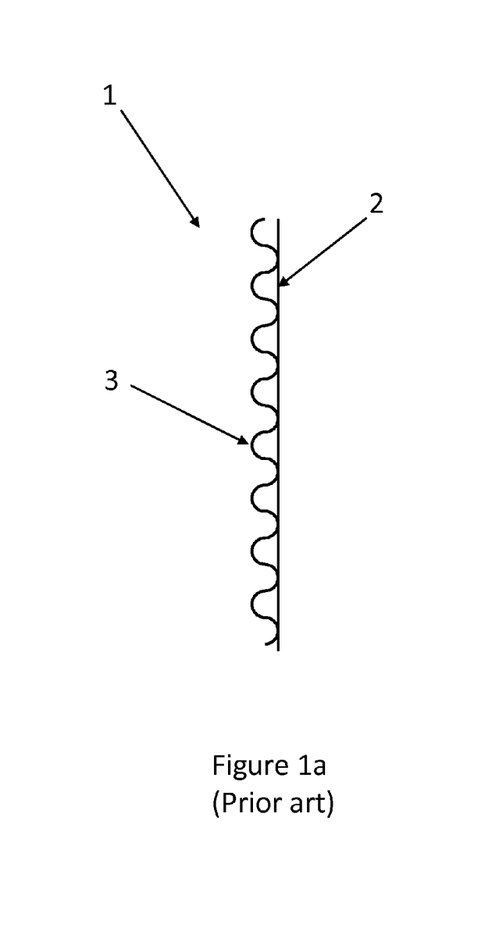
FIG. 1a schematically shows a single face corrugated board according to prior art.

FIG. 1a schematically discloses a single face corrugated board 1 according to prior art. The single face corrugated board 1 includes a first outer layer 2 attached to a corrugated layer 3 including flutes. The single face corrugated board 1 does not exhibit a significant amount of stiffness as it is intended to be wrapped around fragile objects made of for instance glass or porcelain.

Figure 1B:
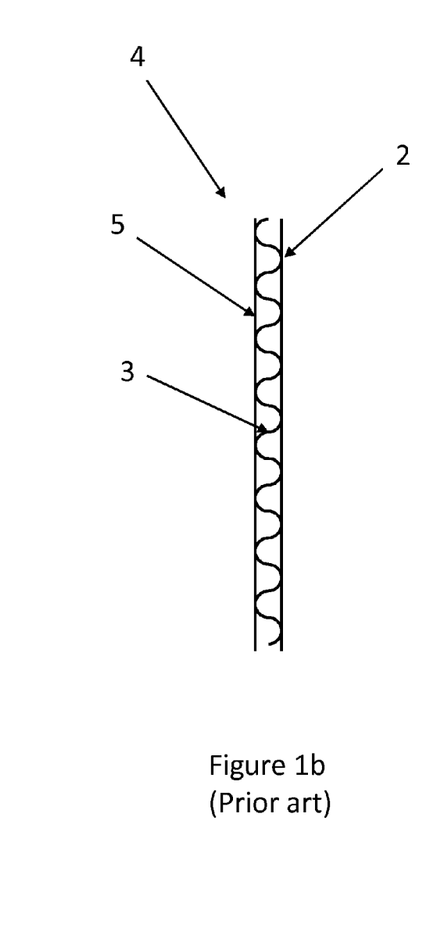
FIG. 1b schematically shows a double face corrugated board according to prior art.

FIG. 1b schematically discloses a double face corrugated board 4 according to prior art. The double face corrugated board 4 includes besides the first outer layer 2 and the corrugated layer 3 including flutes a second outer layer 5. The second outer layer 5 is of the same kind as for the first outer layer 2 aiming at giving the double face corrugated board 4 a high degree of stiffness and strength as it is intended for packaging. At the same time it is not bendable to a high degree without deforming.

Figure 2A:
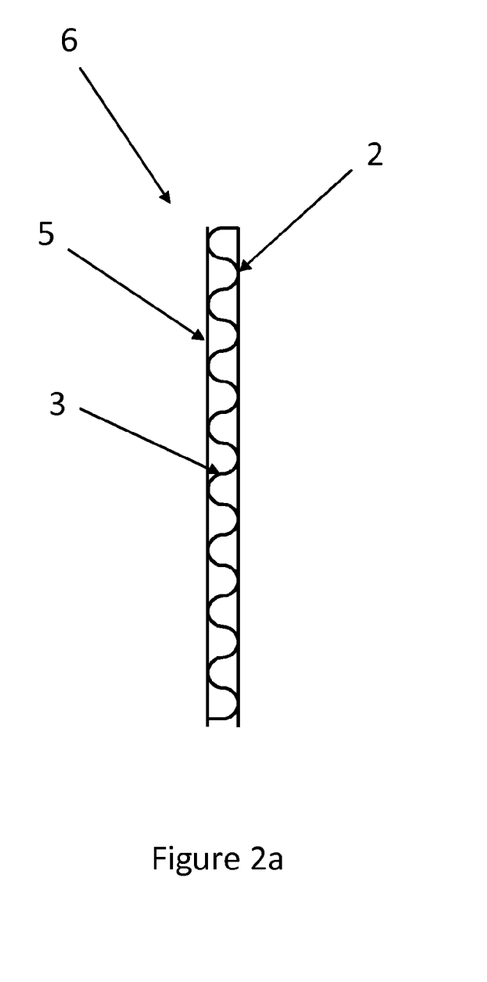
FIG. 2a schematically shows a smoothly bendable board according to an embodiment of the invention in a flat state.

FIG. 2a schematically discloses a smoothly bendable board 6. The smoothly bendable board 6 includes a first outer layer 2, a middle layer 3, and a second outer layer 5 made of a material with a lower bending stiffness than the first outer layer 2. Although the smoothly bendable board in FIG. 2 shows a corrugated middle layer 3, the middle layer 3 is not limited to a corrugated layer.

The following description also applies to a smoothly bendable board having a middle layer made up of, for instance, a thermoformed core. When corrugated middle layer is stated it is conceivable to have a thermoformed core instead. The first outer layer 2 and the second outer layer 5 of the smoothly bendable board 6 may be either a single layer or a laminate of two or more layers having the above mentioned characteristics. The outer layers may also be coated or laminated together with another layer such as a film to achieve barrier properties such as barrier against moisture, water vapour, grease, aroma, oxygen, or migration of volatile substances such as components of mineral oil and free radical from UV-ink or other volatile substances. The corrugated layer 3 including flutes may include a single layer of fluting or two or more layers of fluting where each layer may have the same flute size or different flute sizes.

The first outer layer 2 and the second outer layer 5 may have a surface suitable for printing as is known in the art.

Figure 2B:
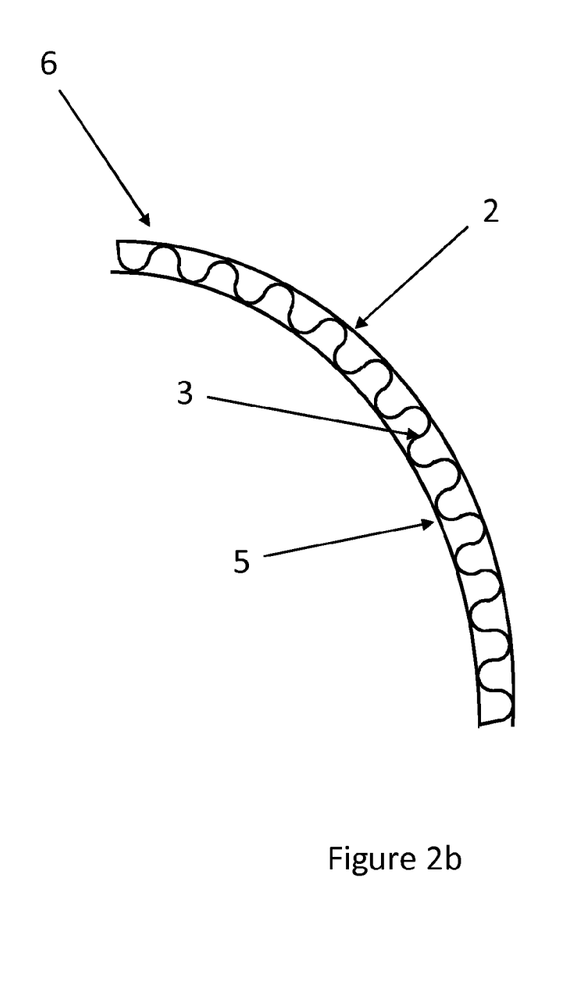
FIG. 2b schematically shows a smoothly bendable board according to an embodiment of the invention being outwardly bent in a direction towards which the second layer faces and perpendicular to the flutes of the corrugated middle layer.

FIG. 2b schematically shows the smoothly bendable board 6 being outwardly bent in a direction towards which the second layer 5 faces and perpendicular to the flutes of the corrugated middle layer 3. The low bending stiffness of the second outer layer 5 in combination with the high bending stiffness of the first outer layer 2 makes this possible. The same characteristics make it difficult for the smoothly bendable board 6 to bend in the opposite direction without deforming one or more of the layers 2, 3 or 5.

The smoothly bendable board 6 shown in FIG. 2b is manufactured by applying a second outer layer 5 to a single face corrugated board, such as one shown in FIG. 1a. The second outer layer 5 is applied to the single face corrugated board by means of starch glue, melt adhesive or any other kind of fastening means suitable for attaching a layer to a fluting layer. The fastening means may contain other functional components, for example to achieve barrier properties according to what has been mentioned earlier.

The second outer layer is generally applied while the single face corrugated board is placed flat on a surface. In order to ensure that the smoothly bendable board 6 stays flat it may be suitable to use an initially curved single faced corrugated board in the direction of the corrugated middle layer 3, and arrange it to be flat before attaching the second outer layer 5. It will then be more difficult for the smoothly bendable board 6 to spontaneously bend in the direction towards which the second layer faces. By using this production method, it is possible to add bending resistance (in the direction towards the second outer layer) to the material.

The smoothly bendable board 6 shall be possible to bend into a radius which corresponds to less than the minimum radius that standard corrugated board can be bent into. After bending of the smoothly bendable board 6 there shall be no creasing, i.e. folding of the first outer layer 2 of the board. The first outer layer 2 of the smoothly bendable board 6 becomes convex after bending. In FIG. 2, the buckling of the second outer layer 5 is not present for illustrative reasons. The concept of buckling is shown in FIG. 3.

Figure 3:
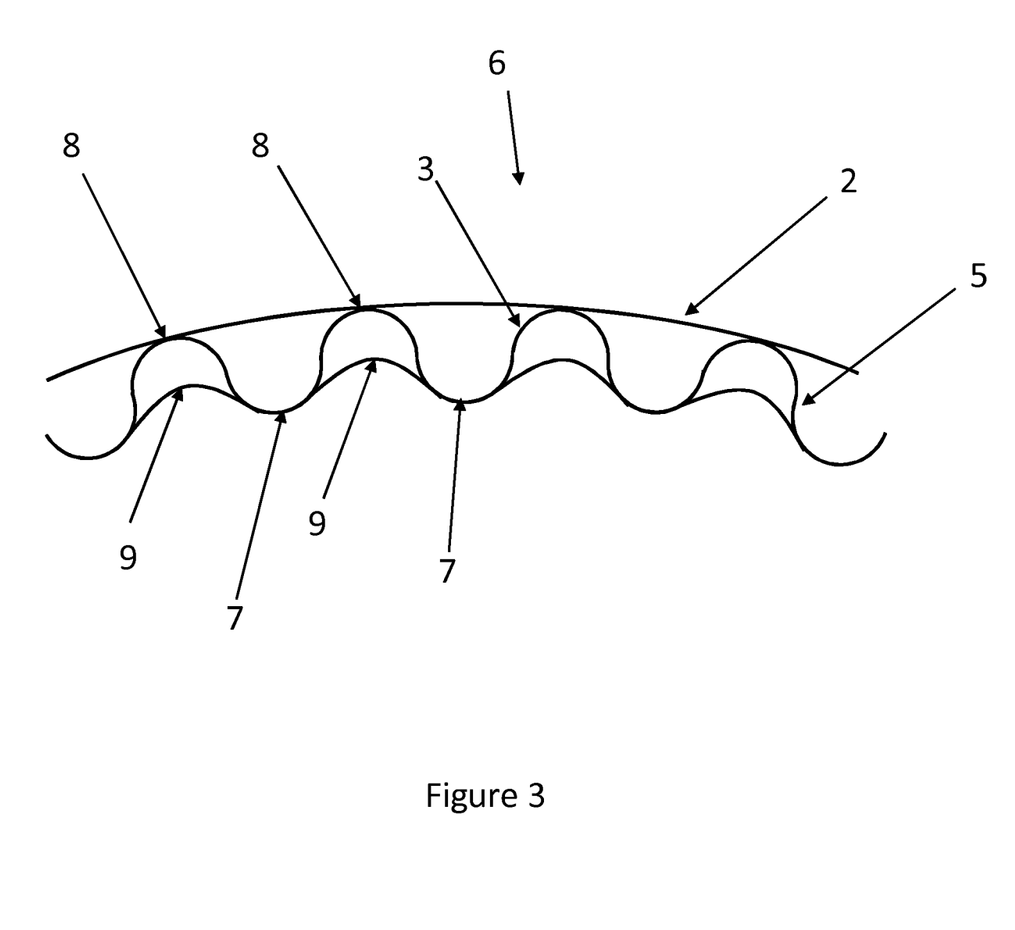
FIG. 3 schematically shows the concept of buckling of the second outer layer.

FIG. 3 shows a close up of the smoothly bendable board 6 in FIG. 2b. In FIG. 3, the first outer layer displays a smooth and continuous radius without creasing. The corrugated middle layer 3 includes a number of peaks 7 facing the second outer layer 5 and a number of valleys 8 facing the first outer layer. Between the peaks 7 the second outer layer includes sections 9. One condition to get a smooth and continuous radius is that the second outer layer 5 should buckle between each peak 7 of the corrugated middle layer 3 when the material is subjected to bending in the bendable direction. When each section 9 of the second outer layer 5 exhibits buckling, the bending can be distributed across each section of the material. In FIG. 3, the size of the buckling of the second outer layer is shown for illustrative purposes and may vary depending on, for instance, the degree of bending and the choice of materials.

The concept of buckling is described in more detail above.

When the smoothly bendable board 6 is exposed to bending the material in the second outer layer 5 will start to buckle between the tops 7 of the corrugated middle layer 3 if the bending stiffness of the second outer layer 5 is low enough.

In order to test the minimum radius that the smoothly bendable board can be bent to without getting material damage, a special test rig has been developed. The test rig includes six pipes with a smooth surface having the diameters 102 mm, 75 mm, 34 mm, 33 mm, 20 mm and 12 mm. The pipes can be made of metal and are mounted onto a base such as a beam or a table for stability.

The width of the test pieces of all boards is 105 mm, i.e. the size of an A4 paper cut in two halves. The length of the test pieces is 297 mm, i.e. the length of an A4 paper. All test pieces are conditioned according to ISO 187 (pre-conditioned at 30% RH, 23 degrees C., and thereafter conditioned at 50% RH, 23 degrees C.).

A selected test piece is first bent around the largest pipe and thereafter visually inspected to detect any damages to the material. The test piece is bent 180°, i.e. such that both ends of the test piece point in the same direction. If no damage is visually detectable, the test piece is bent around the second largest pipe and evaluated in the same way. This procedure is repeated using a smaller pipe diameter until the material is damaged by the bending process or until the material successfully passes bending around the smallest 12 mm pipe. In addition to testing the different types of smoothly bendable corrugated board, a selection of carton board grades is chosen. In addition to the PE-laminated corrugated board, the 483E grade (E-flute used for outdoor displays, 610 g/m2 where the fluting is laminated onto liner+PE-layer+MG-paper) is tested.

Table 1 illustrates the result of the bending test. OK! means that no damage is seen visually. Fail! means that damage such as kinks is seen visually in any of the outer layers. A * before the grade indicates that the board was made according to an embodiment of the invention.

TABLE 1

Smoothly bendable corrugated board and carton board tests for minimum bending radius, *indicates that the board is made according to an embodiment of the invention.

| Grade | 102 mm | 75 mm | 43 mm | 33 mm | 20 mm | 12 mm |
|---|---|---|---|---|---|---|
| *C-flute between EK 165 + News print 45 | OK! | OK! | OK! | OK! | OK! | OK! |
| *B-flute between EK 125 + News print 45 | OK! | OK! | OK! | OK! | OK! | OK! |
| *E-flute between EK 125 + News print 45 | OK! | OK! | OK! | OK! | OK! | OK! |
| *G-flute between EK 125 + News print 45 | OK! | OK! | OK! | OK! | OK! | OK! |
| MCK 600 WLC | OK! | OK! | FAIL! | | | |
| Kasu 300 GC1 | OK! | OK! | FAIL! | | | |

TABLE 1-continued

Smoothly bendable corrugated board and carton board tests for minimum bending radius, *indicates that the board is made according to an embodiment of the invention.

| Grade | 102 mm | 75 mm | 43 mm | 33 mm | 20 mm | 12 mm |
|---|---|---|---|---|---|---|
| MCK 450 GT4 | OK! | OK! | FAIL! | | | |
| Invercote Creato 240 | OK! | OK! | OK! | OK! | OK! | FAIL! |
| Invercote Duo 450 | OK! | OK! | OK! | FAIL! | | |
| Incada Exel 240 | OK! | OK! | FAIL! | | | |
| Eco-Print 300 GT3 | OK! | OK! | OK! | OK! | FAIL! | |
| 483E | FAIL! | | | | | |

As can be seen from table 1, all smoothly bendable boards according to embodiments of the invention are able to bend to a radius that is smaller than conventional boards without exhibiting visual damage to any of the outer layers. As can be seen in table 1, the 483E grade fails already at the 102 diameter pipe.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A smoothly bendable board comprising a middle layer, a first outer layer attached to the middle layer and a second outer layer attached to the middle layer, wherein the middle layer is a corrugated layer comprising flutes, wherein the second outer layer is selected from the group consisting of a fine paper, a supercalendered paper, a machine-glazed paper, a newsprint, a machine-finished paper, a metal foil, and a metalized film, and a laminate of any two or more thereof, wherein the bending stiffness of the second outer layer is chosen according to the equation $$EI_{second\ outer\ layer} < \frac{SCT \cdot \lambda^2}{4\pi^2}, \quad \text{(Equation 2)},$$

such that each section of the second outer layer exhibits buckling according to $$Pk = \frac{4\pi^2 EI}{\lambda^2}, \quad \text{(Equation 1)}$$

where $EI_{second\ outer\ layer}$ is the bending stiffness of the second outer layer, SCT is the second outer layer's compression strength according to the short-span compressive test according to ISO 9895, $\lambda$ is the length between two peaks of the flutes of the middle layer of smoothly bendable board and Pk is the buckling force required to buckle the second outer layer, and wherein the second outer layer has a lower bending stiffness according to ISO 5628 than the first outer layer such that the smoothly bendable board is outwardly bendable only in a direction towards which the second layer faces, where the direction is essentially perpendicular to the flutes of the middle layer, such that the first outer layer of the smoothly bendable board becomes convex after bending, and wherein the smoothly bendable board passes a bending test comprising bending a test piece of the smoothly bendable board 180° around a pipe having a diameter in the range of 102 mm.

2. The smoothly bendable board according to claim 1, wherein the first outer layer is selected from the group consisting of a liner, paper, plastic, a laminate of any two or more thereof, and a composite of any two or more thereof.

3. The smoothly bendable board according to claim 1, wherein the first outer layer is made up of one of a fine paper, supercalendered paper, machine-glazed paper, greaseproof paper, newsprint or machine-finished paper, liner, metal foil, metalized film, a composite material or a laminate of any two or more of fine paper, supercalendered paper, machine-glazed paper, greaseproof paper, newsprint or machine-finished paper, liner, metal foil, metalized film or a composite material.

4. The smoothly bendable board according to claim 1, wherein the corrugated middle layer comprises any of the flute sizes A, B, C, E, F, G or K or a combination of any of the flute sizes A, B, C, E, F, G or K.

5. The smoothly bendable board according to claim 1, wherein the second outer layer is newsprint.

6. The smoothly bendable board according to claim 5, wherein the first outer layer is made up of one of a fine paper, supercalendered paper, machine-glazed paper, greaseproof paper, newsprint or machine-finished paper, liner, metal foil, metalized film, a composite material or a laminate of any two or more of fine paper, supercalendered paper, machine-glazed paper, greaseproof paper, newsprint or machine-finished paper, liner, metal foil, metalized film or a composite material.

7. The smoothly bendable board according to claim 6, wherein the first outer layer is newsprint.

8. A method for producing a smoothly bendable board according to claim 1, comprising middle layer, a first outer layer and a second outer layer, the method comprising:
attaching the first outer layer to the middle layer, producing a single-face board; and
attaching the second outer layer to the middle layer, wherein the second outer layer is selected from the group consisting of a fine paper, a supercalendered paper, a machine-glazed paper, a newsprint, a machine-finished paper, a metal foil, and a metalized film, and a laminate of any two or more thereof,
wherein the middle layer is a corrugated layer comprising flutes, the bending stiffness of the second outer layer is chosen according to the equation $$EI_{second\ outer\ layer} < \frac{SCT \cdot \lambda^2}{4\pi^2}, \quad \text{(Equation 2)},$$

such that each section of the second outer layer exhibits buckling according to $$Pk = \frac{4\pi^2 EI}{\lambda^2}, \quad \text{(Equation 1)},$$

where $EI_{second\ outer\ layer}$ is the bending stiffness of the second outer layer, SCT is the second outer layer's compression strength according to the short-span compressive test according to ISO 9895, $\lambda$ is the length between two peaks of the flutes of the middle layer of smoothly bendable board and Pk is the buckling force required to buckle the second outer layer, and wherein the second outer layer has a lower bending stiffness according to ISO 5628 than the first outer layer such that the smoothly bendable board is outwardly bendable only in a direction towards which the second layer faces, where the direction is essentially perpendicular to the flutes of the middle layer, such that the first outer layer of the smoothly bendable board becomes convex after bending.

9. The method according to claim 8, the method further comprising:

using an initially curved single faced board curved in the direction towards which the first layer faces, and arranging the initially curved single faced board to be flat before attaching the second outer layer.

10. The method according to claim 8, the method further comprising:

attaching the first outer layer to the middle layer, producing a single-face board;

arranging the single-face corrugated board such that it is curved in a direction towards which the second layer faces; and attaching the second outer layer to the curved corrugated middle layer.

\* \* \* \* \*